May 30, 1933.  J. COYLE  1,912,258
MACHINE FOR FLANGING CAN BODIES
Filed March 31, 1932
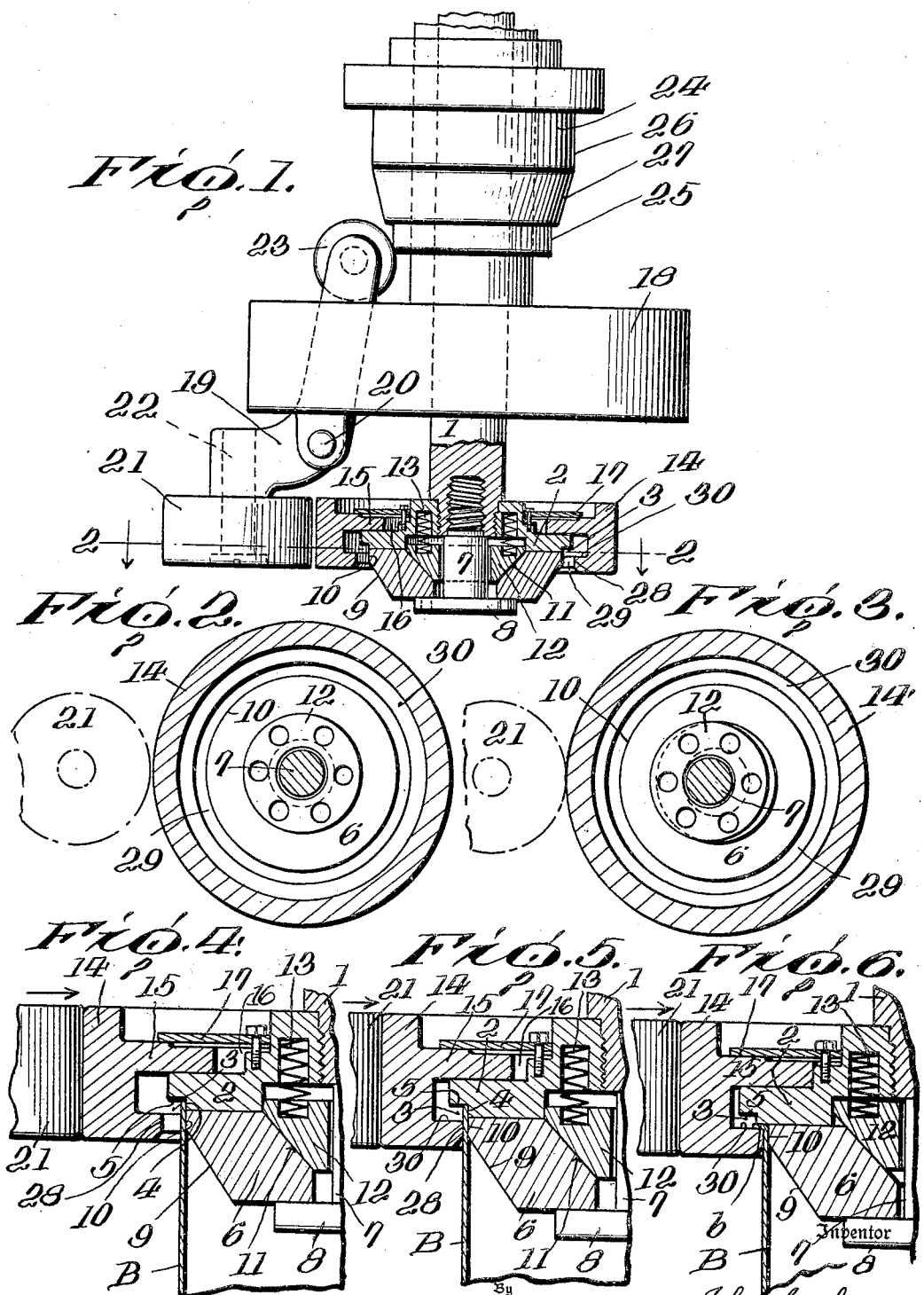

Patented May 30, 1933

1,912,258

UNITED STATES PATENT OFFICE

JOHN COYLE, OF BALTIMORE, MARYLAND, ASSIGNOR TO CONTINENTAL CAN COMPANY, INC., OF NEW YORK, N. Y., A CORPORATION OF NEW YORK

MACHINE FOR FLANGING CAN BODIES

Application filed March 31, 1932. Serial No. 602,315.

The invention relates to new and useful improvements in machines for flanging cylindrical can bodies, and more particularly to a flanging machine of the type wherein a circular flange turning member substantially fitting the interior of the can body cooperates with an annular flange turning member surrounding the can body in the forming of the flange.

An object of the invention is to provide a flanging machine of the above type wherein the can body is firmly gripped and supported in the region directly beneath the flange during the forming of the flange on the can body.

A further object of the invention is to provide a flanging machine of the above type with a simplified form of means for shifting the parts to turn the flange.

In the drawing—

Figure 1 is a view showing more or less diagrammatically a portion of a machine for forming a flange on a can body which embodies the invention;

Fig. 2 is a sectional view on the line 2—2 of Fig. 1, and showing the parts positioned to receive the can body;

Fig. 3 is a view similar to Fig. 2, but showing the parts shifted to a position for the turning of the flange;

Fig. 4 is an enlarged detail in vertical section showing the position of the parts when the can body is first placed therein and prior to the turning of the flange;

Fig. 5 is a similar view, but showing the annular ring as shifted so as to contact with the outer wall of the can body preparatory to the turning of the flange, and Fig. 6 is a similar view, but showing the parts positioned for the finished flange on the can body.

The invention resides in a flanging machine which includes a chuck adapted to enter a cylindrical can body, a circular flange turning member positioned directly above the chuck, and an annular flange turning member carried by the supporting means for the circular flange turning member. The circular flange turning member is preferably non-rotating. The annular flange turning member is mounted so that it may rotate about the can as the flange is formed thereon, and is also mounted so that it may be shifted radially of the center of the circular flange turning member. The chuck is carried by the supporting means for the circular flange turning member and is so mounted that it may be shifted laterally of the circular flange turning member, but is maintained in contact therewith. The circular flange turning member is provided with a recess at the lower peripheral portion thereof. The recessed portion of the circular flange turning member is of substantially the same diameter as the chuck, and the recess is of a vertical depth depending upon the width of the flange that is to be formed in the can body. The can body is slipped over the chuck and into the recessed portion of the circular flange turning member. The annular flange turning member is shifted laterally by a roller contacting therewith and traveling around the annular member. This causes the annular member to contact with the outer wall of the can in the limited region, clamping the same against the chuck, and to move the chuck and can body relative to the circular flange turning member which turns a flange on the can body substantially at right angles thereto.

The invention will be better understood by a brief reference to the illustrated embodiment thereof. In the drawing, the flanging machine is only shown in part. The complete machine includes means for supporting the can body on which the flange is to be formed, and this portion of the machine may be of any desired construction. The invention is embodied in what might be termed a flanging head. This flanging head may be used in a single unit machine or in a machine where there are a series of flanging heads operating in succession, and may be used one at each end of the can body for simultaneously flanging both ends thereof.

The flanging head includes a center stem or non-rotating shaft 1 on which is mounted a circular flange turning member 2. Said flange turning member has a threaded connection with the stem or shaft 1. Said circular flange turning member is provided with a recess 3 in the lower portion thereof, and at the peripheral edge thereof. Said recess 3 forms a circular wall 4 of uniform diameter and which is preferably substantially of the same diameter as the can body which is indicated at B. The recess also forms a stop shoulder 5 which limits the extent to which the circular flange turning member can move into the can body.

Directly beneath the flange turning member 2 is a chuck 6. The chuck 6 is secured to the stem or shaft 1 by a threaded bolt 7 having an extended head 8 which bears against the under face of the chuck. The chuck has an opening therethrough considerably larger than the shank portion of the bolt 7. The head 8 of the bolt supports the chuck so that it is free to slide laterally relative to the flange turning member 2, but is maintained in loose contact therewith at all times. The chuck has a tapered wall 9 which enters into the can body and directs it into the recess in the flange turning member. The chuck also has a cylindrical wall 10 which is of substantially the same diameter as the can body and the same diameter as the wall 4 on the flange turning member 2. The chuck has a central recess which forms an inclined wall 11. Disposed within this recess is a cone-shaped member 12, the outer face of which is inclined to correspond to the inclined wall 11. This cone-shaped member is forced downwardly by means of springs 13. The cone-shaped member has axial but not lateral movement on the bolt 7, and is continually urging the chuck to a centered position relative to the flange turning member 2. The cone-shaped member will, however, yield to allow the chuck to shift to an eccentric position relative to this flange turning member 2 when pressure is applied against the peripheral wall of the chuck. Encircling the chuck and flange turning member 2 is an annular flange turning member 14. This annular flange turning member 14 is provided with an inwardly extending web 15 which overlies the upper face of the flange turning member 2. There is an opening 16 centrally through this web 15 which is of larger diameter than the hub of the flange turning member 2. Overlying this web 15 is a clamping plate 17 secured by suitable bolts to the flange turning member 2. The web 15 has a frictional fit between this overlying plate 17 and the flange turning member 2 so that it is free to be forced laterally to an eccentric position relative to the flange turning member 2.

Rotating about the stem or shaft 1 is a head 18. This head may be rotated by any suitable means. Pivoted to this rotating head is a lever 19. Said lever is pivoted at 20 to a depending lug carried by the head. The lever 19 carries a roller 21 which is mounted for rotation on a supporting stem 22. The roller is of substantially the same width as the annular flange turning member 14 and is adapted to be forced into contact therewith. Said roller travels about this annular flange turning member 14, and when the roller is shifted toward the center of its axis of rotation, it will engage the flange turning member 14 and force the same to an eccentrically set position on the flange turning member 2. Inasmuch as the head 18 rotates relative to the flange turning member 2 and the can body, which is non-rotating, the point of contact between the roller 21 and the annular flange turning member 14 is a constantly shifting point of contact. The lever 19 carries a roller 23 at its upper end which makes contact with a control cam 24. This control cam may or may not be rotated around the center of the stem 1, but it has an endwise movement in the stem which is accomplished by any suitable means. The cam 24 is provided with a concentric portion 25, and a concentric portion 26, with a cone-shaped portion 27 between the two concentric portions. When the control cam 24 is raised, the roller 23 on the lever 19 is opposite the small concentric portion 25. At this time, the centrifugal force acting on the seaming roll 21 will move the same outward and this will cause the die ring 14 to take a position concentric of the rotating head. When the cam 24 is lowered, as viewed in Fig. 1, the cone-shaped portion 27 will gradually force the roller inward, and when the concentric portion 26 is reached, the roller will have been forced inwardly to its extreme inward position.

In the operation of the flanging head, the can body is placed on a support which is raised or the flanging head is lowered, so that the chuck 6 is caused to enter the can body and the upper edge of the wall of the can body caused to contact with the stop shoulder 5. It will be noted that the chuck and the cylindrical face 4 of the flange turning member 2 are in contact with the inner wall of the can body. At this time, the annular flange turning member 14 is concentric to the chuck and flange turning member 2. The position of the parts just described are those illustrated in Figures 1 and 4, and the can body in Fig. 4 is in place preparatory to the movement of the flange turning member 14 into contact with the wall of the can body. The head 18 is rotating, and the roller 21 continuously traveling about the flange turning member 14. The cam 24 is lowered and as it is lowered the roller 21 is moved inward and comes into contact with the flange turning member 14 with which it contacts inwardly toward the center of the stem 1. This, of course, forces the portion 14 diametrically opposed to where the roller contacts therewith outwardly away from the center of the stem 1. The resulting action is that the inner face of the flange turning member 14 is brought into contact with the outer wall of the can body in a certain limited region. The flange turning member 14 has an inwardly extending portion 28, and it is the inner face 29 of this part of the flange turning member which contacts with the outer wall of the can. There is also a horizontal face 30 on the upper side of this inwardly projecting portion 28 which is spaced below the under face of the flange turning member 2 a distance corresponding to the thickness of the metal of the wall of the container.

After the flange turning member 14 is brought into contact with the wall of the can body, the region of contact will travel with the roller 21, and will, therefore, progressively move around the entire outer face of the can body. A continued downward movement of the cam 24 will cause the can body and also the chuck to shift laterally relative to the flange turning member 2 which is held in a fixed position by the supporting stem 1. The result is that the wall of the can body B is turned so as to form a flange b at the end thereof, as clearly shown in Fig. 6 of the drawing. The shape of the cam 24 is such that the can body is shifted gradually through the forcing of the flange turning member 14 laterally of the flange turning member 2, and therefore, the wall of the can body is turned outwardly into a flange by the progressive engagement of the flange turning member 14 with the outer wall of the can body. During this turning of the flange, the portion where force is applied to form the flange is firmly gripped between the chuck and the flange turning member 14. The chuck does not move lengthwise of the wall of the can body; but contacts therewith directly beneath the portion which is turned to form the flange. This insures the proper turning of the flange without in any way distorting the wall of the can body in the region of the flange. The upper face of the flange turning portion 28 is preferably horizontal, and therefore, a flange is turned on the can body which is practically at right angles to the longitudinal body wall of the can. The space between the flange turning members is substantially the thickness of the metal, and therefore, the flange is under control during the entire turning of the flange. The annular flange turning member 14 progressively moves the can body relative to the flange turning member 2 and this causes the extreme lower edge of the flange turning member 2 to turn the metal wall onto the annular flange turning member 14 thus forming the flange. After the flange is formed, the cam 24 is raised, which permits the roller 21 to move outward and the flange turning member 14 to be centered thereby relative to the stem 1, and the can body can then be lowered and removed from the flanging head.

As noted above, the flanging head may be used in a unit machine for flanging only one end of the can body, or may be duplicated and both ends of the can body simultaneously flanged. It may be used in a vertical position or in a horizontal position. It may also be used in a multiple station flanging machine where there are a series of flanging units. It will also be noted that there are comparatively few moving parts in the flanging head, and that the can body is stationary during flanging, and that the parts directly contacting with the can body are not positively rotated. The chuck, the can body and the flange turning member 2 are stationary in the embodiment of the invention described. The flange turning member 14 may gradually creep around the can body, following the direction of travel of the roller 21, but this is not necessary.

It will also be obvious that minor changes in the details of construction and the arrangement of the parts may be made without departing from the spirit of the invention as set forth in the appended claims.

Having thus described the invention, what I claim as new and desire to secure by Letters Patent, is—

1. A machine for flanging a cylindrical can body comprising an annular flange turning member surrounding the can body, a circular flange turning member disposed within the can body and engaging the wall thereof above the annular flange turning member, a chuck adapted to extend into said can body and engage the wall thereof directly beneath the circular flange turning member, means for preventing said chuck from moving endwise of the can during the forming of the flange, means for shifting said annular flange turning member for causing its inner face to engage the outer wall of the can body in a limited region, and means for causing the region of contact of the annular member with the can body to progressively travel around the can body, said means for shifting said annular member operating to clamp the can body against the chuck and to shift the chuck and can body relative to the circular flange turning member for progressively turning the flange on the can body.

2. A machine for flanging a cylindrical can body comprising a circular flange turning member disposed within the can body, means for non-rotatively supporting the same, an annular flange turning member surrounding the can body and having the upper surface thereof disposed in a plane spaced below the plane of the lower face of the circular flange turning member a distance substantially equal to the thickness of the metal of the wall of the can body, a chuck adapted to extend into said can body and engage the wall thereof directly beneath the circular flange turning member, means for supporting said chuck in contact with the circular flange turning member and so as to permit said chuck to shift laterally thereon, means for yieldingly forcing said chuck to a concentric position relative to the circular flange turning member, means for shifting said annular member for causing its inner face to engage the outer wall of the can body in a limited region, and means for causing the region of contact of the annular member with the can body to progressively travel around the can body, said means for shifting the annular member operating to clamp the can body against the chuck and shift the chuck and can body relative to the circular flange turning member for progressively turning the flange.

3. A machine for flanging a cylindrical can body comprising a circular flange turning member disposed within the can body, means for non-rotatively supporting the same, an annular flange turning member surrounding the can body and having the upper surface thereof disposed in a plane spaced below the plane of the lower face of the circular flange turning member a distance substantially equal to the thickness of the metal of the wall of the can body, a chuck adapted to extend into said can body and engage the wall thereof directly beneath the circular flange turning member, means for supporting said chuck in contact with the circular flange turning member and so as to permit said chuck to shift laterally thereon, means for yieldingly forcing said chuck to a concentric position relative to the circular flange turning member, a roller adapted to engage said annular flange turning member at the periphery thereof, means for causing said roller to travel around the can, and means for shifting the roller radially of the can for causing the annular member to clamp the can body against the chuck and shift the chuck and can body relative to the circular flange turning member for progressively turning the flange on the can body.

In testimony whereof, I affix my signature.

JOHN COYLE.